United States Patent
Matsuda

[19]

[11] Patent Number: 6,146,763
[45] Date of Patent: Nov. 14, 2000

[54] ULTRAVIOLET-CUTOFF MATERIAL AND PROCESS FOR PREPARING THE SAME

[75] Inventor: Yasuhiro Matsuda, Niitsu, Japan

[73] Assignee: Nikki Chemical Co., Ltd., Tokyo, Japan

[21] Appl. No.: 09/172,171

[22] Filed: Oct. 14, 1998

[30] Foreign Application Priority Data

May 14, 1998 [JP] Japan .................................. 10-148284

[51] Int. Cl.[7] .............................. B32B 15/02; B32B 19/00
[52] U.S. Cl. ........................ 428/404; 428/403; 106/626; 106/632
[58] Field of Search ..................... 428/432, 454, 428/472, 689, 324, 325, 363, 403, 404; 424/401, 63, 64, 69, 490; 106/626, 632, 436; 514/844, 846, 951

[56] References Cited

U.S. PATENT DOCUMENTS

| | | | |
|---|---|---|---|
| 4,648,908 | 3/1987 | Takasuka et al. | 106/417 |
| 4,857,308 | 8/1989 | Fukasawa et al. | 424/63 |
| 5,326,392 | 7/1994 | Miller et al. | 106/417 |
| 5,478,550 | 12/1995 | Suzuki et al. | 424/59 |
| 5,690,916 | 11/1997 | Kimura et al. | 424/59 |
| 5,705,444 | 1/1998 | Tompkins et al. | 442/76 |
| 5,898,358 | 4/1999 | Tompkins et al. | 337/163 |

FOREIGN PATENT DOCUMENTS

| | | |
|---|---|---|
| 0 526 712 | 2/1993 | European Pat. Off. . |
| 0 732 379 | 9/1996 | European Pat. Off. . |
| 9-59129 | 3/1997 | Japan . |
| 9-87141 | 3/1997 | Japan . |
| 10087469A | 4/1998 | Japan . |

OTHER PUBLICATIONS

Patent Abstract of Japan, Publication No. 01040565 A, Publication Date 02/10/89.

W. Schäfer, Determination of traces of tetracarbonylnickel and pentacarbonylnickel and pentacarbonyliron in streams of fluids such as synthesis gas, Fresenius Z. Anal. Chem.(1989) 335:785–790 (Database WPI;Section Ch, Week 198912; Derwent Publications Ltd., London GB; Class B07, AN 1989–089978; XP000982265 & JP 01 040565 A (SHISEIDO CO LTD), 02/10/89 *abstract*).

*Primary Examiner*—Timothy M. Speer
*Assistant Examiner*—Stephen Sten
*Attorney, Agent, or Firm*—Kubovcik & Kubovcik

[57] ABSTRACT

There are provided an ultraviolet-cutoff material comprising a material, capable of cutting off ultraviolet light, coated with a clay mineral, and a process for preparing an ultraviolet-cutoff material, comprising the steps of dispersing a clay mineral in a medium, dispersing a material capable of cutting off ultraviolet light in a medium, mixing the two dispersion liquids prepared in the steps a) and b) together to coat the material capable of cutting off ultraviolet light with the mixture, subjecting the mixture to solid-liquid separation and heating the solid matter provided in the step d).

6 Claims, 2 Drawing Sheets

Particle size distribution before and after swelling/dispersion

ULTRAVIOLET-CUTOFF MATERIAL AND PROCESS FOR PREPARING THE SAME

FIELD OF THE INVENTION

This invention relates to an ultraviolet-cutoff material, and more particularly to an ultraviolet-cutoff material, comprising a material, capable of cutting off ultraviolet light selected from the group consisting of titanium oxide, hydrated titanium oxide, and an inorganic material bearing thereon titanium oxide and/or hydrated titanium oxide, coated with a clay mineral as an inert material that can make it impossible for the photocatalytic activity, in a material having both ultraviolet-cutoff activity and photocatalytic activity, to be developed and can develop only the ultraviolet-cutoff activity without photo-deterioration of a borne and/or dispersed organic substrate.

BACKGROUND OF THE INVENTION

Ultraviolet-cutoff materials have hitherto found expanded applications as an additive to food packaging materials for avoiding degradation of oils, furniture-protective sheets for avoiding discoloration and coloration, sheets for vinyl houses, foundations for preventing a sunburn or skin cancer, ultraviolet-cutoffs fibers, paints stabilized against ultraviolet light, ultraviolet-cutoff glass, papers, and building materials and the like. Basically, the material capable of cutting off ultraviolet light absorbs ultraviolet energy independently of whether it is an organic material or an inorganic material. Therefore, absorption of the ultraviolet energy causes a change in the material, per se, capable of cutting off ultraviolet light or results in release of active oxygen or electrons having a capability of oxidizing an object which comes into contact with the material capable of cutting off ultraviolet light. In many cases, this property becomes a demerit which surpasses the merit provided by the ultraviolet-cutoff effect. Specifically, in an attempt to attain ultraviolet-cutoff effect by adding the material capable of cutting off ultraviolet light to a plastic film, the film per se is photo-deteriorated, deteriorating the durability of the film. Cosmetics with ultraviolet-cutoff effect being imparted thereto has a fear of degrading and denaturing an organic material as a dispersing medium or otherwise photo-deteriorating the skin per se. In the case of an organic ultraviolet-cutoff material, the ultraviolet-cutoff material per se is converted to a different material, resulting in loss of ultraviolet-cutoff activity. Therefore, the ultraviolet-cutoff effect cannot be permanent. On the other hand, in the case of an inorganic ultraviolet-cutoff material, an attempt has been made to coat the surface of the material with an inactive material, such as $SiOhd 2$ or $Al_2O_3$, to inhibit the photocatalytic activity (for example, Japanese Patent No. 1934945).

In the ultraviolet-cutoff material, however, the percentage hiding should be high in order to increase the cutoff effect, and, at the same time, the ultraviolet-cutoff material should be highly permeable to visible light. Therefore, the particle diameter of the inorganic ultraviolet-cutoff material is so small that the cohesive force is high making it impossible to homogeneously disperse the particles. The agglomeration and heterogeneous dispersion lower the cutoff effect and remarkably deteriorates the appearance. For example, titanium oxide for cosmetic applications, coloration inherent in titanium oxide occurs, which is causative of a deterioration in value as cosmetics.

In order to improve the dispersibility, an attempt has been made to bear a flaky clay mineral on the surface thereof (for example, Japanese Patent Application Laid-Open Gazette Nos. 87141/1997 and 59129/1997) or to intercalate the flaky clay mineral. It is a matter of course that, in the material, capable of cutting off ultraviolet light, bearing thereon titanium oxide or hydrated titanium oxide, the titanium oxide or hydrated titanium oxide is exposed on the surface of the ultraviolet-cutoff material. Also in the case of the material, capable of cutting off ultraviolet light, containing titanium oxide or hydrated titanium oxide incorporated by intercalation into between layers based on the principle of ion exchange, exposure of titanium oxide or hydrated titanium oxide coordinated on the outermost surface is unavoidable, and the percentage exposure of titanium oxide or hydrated titanium oxide coordinated on the outermost surface increases with enhancing the degree of dispersion due to a reduction in diameter of fine particles and a reduction in layer thickness.

That is, at the present time, a problem of agglomeration of titanium oxide or hydrated titanium oxide and a problem of exposure of titanium oxide or hydrated titanium oxide could not have been simultaneously solved.

In order to avoid photo-deterioration of the organic substrate by the UV-cutoff material, it is necessary to avoid contact of titanium oxide or the like with the organic substrate. Intercalation of a metal oxide into the clay mineral as means for this purpose is based on the principle of ion exchange. Therefore, a titanium oxide precursor is coordinated on the bottom face which is located on the outermost position of the clay mineral sheet, making it impossible to avoid exposure of $TiO_2$. Further, a reduction in layer thickness of the clay mineral and metal oxide or a reduction in diameter of fine particles increase the percentage exposure.

Furthermore, the titanium oxide precursor, upon heating, is strongly bonded to the clay mineral sheet, inhibiting swelling and dispersion as properties of the clay mineral, which makes it impossible to reduce the layer thickness and to reduce the diameter of fine particles.

Likewise, a prior art method, wherein a hydrated titanium oxide sol is hydrolyzed to deposit titanium oxide on the surface of flaky particles of the clay mineral, suffers from this drawback (for example, Japanese Patent Application Laid-Open Gazette Nos. 87141/1997 and 59129/1997).

Accordingly, an object of this invention is to provide an ultraviolet-cutoff material that can make it impossible for the photocatalytic activity, in a material having both ultraviolet-cutoff activity and photocatalytic activity, to be developed and can develop only the ultraviolet-cutoff activity without photo-deterioration of a borne/dispersed organic substrate, and to provide a process for preparing the same.

SUMMARY OF THE INVENTION

The present inventors have made extensive and intensive studies with a view to solving the above problems of the prior art and, as a result, have found that coating of an inorganic material, capable of cutting off ultraviolet light selected from the group consisting of titanium oxide, hydrated titanium oxide, and an inorganic material bearing thereon titanium oxide or hydrated titanium oxide, coated with a clay mineral as an inert material can make it impossible for the photocatalytic activity, in the material having both ultraviolet-cutoff activity and photocatalytic activity, to be developed and can develop only the ultraviolet-cutoff activity without photo-deterioration of a borne/dispersed organic substrate, which has led to the completion of this invention.

Thus, according to one aspect of this invention, there is provided an ultraviolet-cutoff material comprising a material, capable of cutting off ultraviolet light, coated with a clay mineral.

According to another aspect of this invention, there is provided a process for preparing an ultraviolet-cutoff material comprising the steps of:

a) dispersing a clay mineral in a medium;

b) dispersing a material, capable of cutting off ultraviolet light in a medium;

c) mixing the two dispersion liquids prepared in the steps a) and b) together to coating the material, capable of cutting off ultraviolet light, with the mixture;

d) subjecting the mixture to solid-liquid separation; and e) heating the solid matter provided in the step d).

The material capable of cutting off ultraviolet light according to this invention refers to a material comprising at least one member selected from the group consisting of titanium oxide, hydrated titanium oxide, and an inorganic material bearing thereon titanium oxide and/or hydrated titanium oxide.

Materials capable of cutting off ultraviolet light usable in this invention include, in addition to the above titanium compounds, oxides, of iron, zinc, tin and the like, having ultraviolet-cutoff activity, particularly ferric oxide, zinc oxide, and stannic oxide, and inorganic materials bearing thereon the above oxides.

DESCRIPTION OF THE PREFERRED EMBODIMENT

In the ultraviolet-cutoff material of this invention, titanium oxide $TiO_2$, hydrated titanium oxide and the like should not be exposed on the surface of the material, and properties inherent in clay mineral, that is, swelling and highly dispersible properties, should be imparted to the ultraviolet-cutoff material.

In the process for preparing an ultraviolet-cutoff material according to the present invention, basically, when the clay mineral is used alone, the properties of the clay mineral are not lost and, at the same time, a temperature region exists wherein the force of bonding between the material capable of cutting off ultraviolet light and the clay mineral sheet is increased. Specifically, the material capable of cutting off ultraviolet light is homogeneously mixed in a sol of the clay mineral to bring the bottom face of the clay mineral into contact with the material capable of cutting off ultraviolet light, and, upon heating of the mixture at an adsorbed water-eliminating temperature or above, the bottom face is strongly bonded to the material capable of cutting off ultraviolet light. As a result, the material, capable of cutting off ultraviolet light, comprising titanium oxide, hydrated titanium oxide, or a material bearing thereon titanium oxide or hydrated titanium oxide is sandwiched by the clay mineral and consequently is coated with the clay mineral without exposure of titanium oxide or hydrated titanium oxide.

In this case, when the amount of the clay mineral is a necessary and sufficient one, the minimum unit is constituted by clay mineral (C)/material capable of cutting off ultraviolet light (M)/clay mineral (C). On the other hand, when the amount of the clay mineral is insufficient, a part of the unit is constituted by C/M/C/M/C or a larger number of layers.

Generally available titanium oxide and hydrated titanium oxide have much smaller particle diameter than the clay mineral. Therefore, the amount of the clay mineral required for completely covering these particles is so large that the content of titanium in the ultraviolet-cutoff material should be lowered. Further, in this case, the ultraviolet-cutoff activity of the material becomes unfavorably small. For this reason, use of an inorganic material, on the surface of which titanium oxide or hydrated titanium oxide has been previously supported, is advantageous also from the viewpoint of efficiency.

Bottom faces of the clay mineral maintain the original crystal structure so far as heating is carried out in such a temperature range as will not cause a change in crystal structure, permitting the medium to be penetrated into between layers, which results in swelling. Swelling and dispersion using a polar, low-boiling medium followed by removal of the low-boiling medium by distillation enable a well dispersed fine powder; with a clay mineral sheet sandwiching the material capable of cutting off ultraviolet light being located on the outermost surface, to be easily produced without grinding.

High heating temperature leads to loss of swelling and dispersing properties, causing the material capable, of cutting off ultraviolet light to be exposed to a fractured surface in the course of grinding for a reduction in particle size. This makes it impossible to distinguish the product from a simple mixed product. The material capable of cutting off ultraviolet light referred to herein may be one which has been previously borne and deposited on the surface of particles. The sandwiched titanium oxide absorbs UV and has UV-cutoff activity corresponding to the titanium oxide content. Since, however, the sandwiched titanium oxide does not come into contact with the organic substrate, it does not exhibit oxidative decomposition activity as the photocatalyst.

The process for preparing an ultraviolet-cutoff material according to this invention will be described in detail.

In the process for preparing an ultraviolet-cutoff material according to this invention, at the outset, in the step a), a clay mineral is dispersed in a medium to prepare a clay mineral dispersion liquid. Although the concentration of the clay mineral dispersion liquid is not particularly limited, it is preferably in the range of 0.5 to 3.0% by weight from the viewpoint of preparation efficiency.

Clay minerals usable in the process for preparing an ultraviolet-cutoff material according to this invention are phyllosilicates having a layer structure and include smectites, such as saponite and montmorillonite, vermiculite, and swellable mica.

Next, in the step b), a material capable of cutting off ultraviolet light is dispersed in a medium to prepare a dispersion liquid. Although the concentration of the material capable of cutting off ultraviolet light is not particularly limited, it is preferably in the range of 0.5 to 3.0% by weight from the viewpoint of preparation efficiency.

The amount of the clay mineral for covering the material capable of cutting off ultraviolet light is preferably 20 to 500 parts by weight based on 100 parts by weight of the material capable of cutting off ultraviolet light from the viewpoint of taking into consideration the oxidative decomposition activity remaining in the ultraviolet-cutoff material. When the amount of the clay mineral is less than 20 parts by weight, the residual oxidative decomposition activity of the ultraviolet-cutoff material is unfavorably increased. On the other hand, when the amount of the clay mineral exceeds 500 parts by weight, the amount of extra clay mineral is unfavorably increased.

Subsequently, in the step c), the two dispersion liquids thus prepared, that is, the clay mineral dispersion liquid and the metal oxide dispersion liquid, are mixed together with stirring. The temperature of the dispersion liquids at the time of mixing is preferably in the range of 10 to 70. The stirring time is preferably in the range of 0.5 to 24 hr.

When high dispersion of the material capable of cutting off ultraviolet light on a high level is possible, this material may be mixed directly into the clay mineral dispersion liquid to conduct coating.

Next, in the step d), the mixture of the clay mineral with the material capable of cutting off ultraviolet light is subjected to solid-liquid separation to prepare a cake.

Finally, in the step e), the cake is heated to prepare an ultraviolet-cutoff material comprising a material, capable of cutting off ultraviolet light, coated with a clay mineral. Preferably, heating is carried out at a temperature of 60 to 350 so that the loss on drying at 105 to 110 is 3 to 15% by weight. When the loss on drying is less than 3% by weight, the swelling property, a property inherent in the clay mineral, is lost. In this case, a reduction in particle size should rely upon grinding which unfavorably causes a part of the material capable of cutting off ultraviolet light to be exposed on a fractured surface. On the other hand, when the loss on drying exceeds 15% by weight, bonding between the clay mineral and the material capable of cutting off ultraviolet light is unsatisfactory. This causes the clay mineral and the material capable of cutting off ultraviolet light to be separated from each other in the course of swelling/dispersion, disadvantageously resulting in exposure of a part of titanium oxide in the material capable of cutting off ultraviolet light.

In the ultraviolet-cutoff material prepared by the preparation process of an ultraviolet-cutoff material according to this invention, a material capable of cutting off ultraviolet light, such as titanium oxide, is efficiently coated with a phyllosilicate, as a clay mineral, such as smectite, vermiculite, or mica.

DESCRIPTION OF THE PREFERRED EMBODIMENTS

Figure 1:
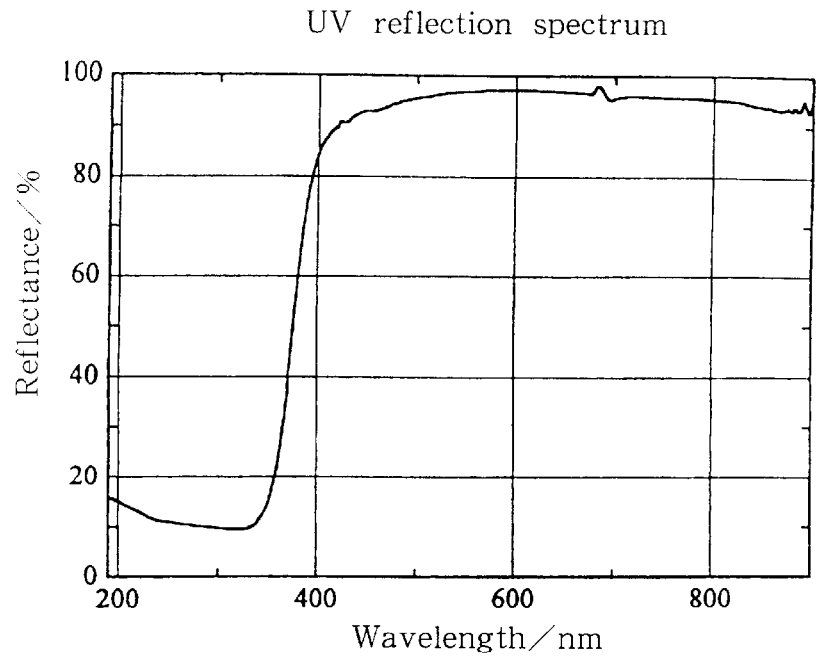
FIG. 1 is a diagram showing UV reflection spectra respectively for a powder prepared in Example 1 (a) and a powder prepared in Comparative Example 1 (b).
Figure 1:
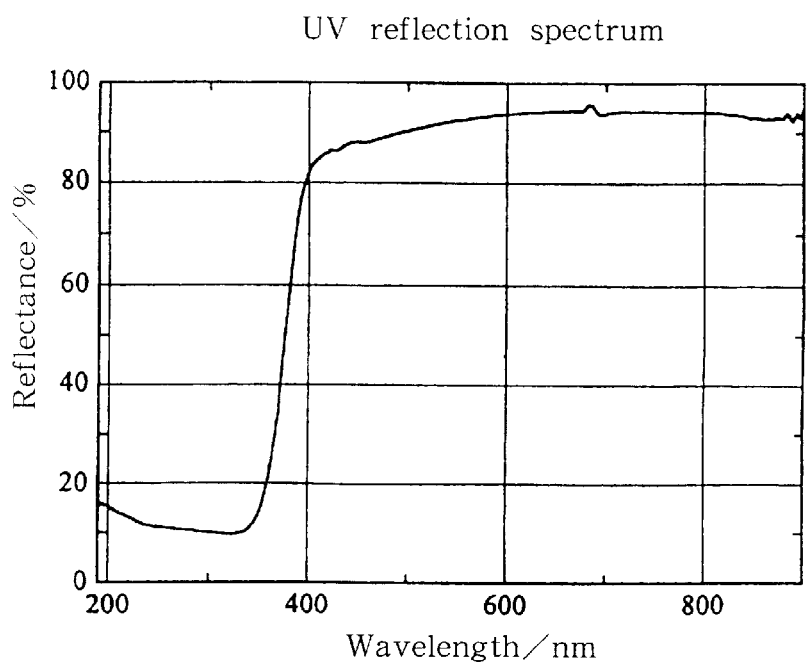

This invention will be described in more detail with reference to the following Examples and Comparative Examples, though it is not limited to these Examples only. Further, in the following Examples and Comparative Examples, materials with titanium oxide and/or hydrated titanium oxide borne on the surface thereof by an ion exchange or precipitation method was used in order to increase the titanium content. Use of titanium oxide or hydrated titanium oxide having a large particle diameter can provide the same effect.

COMPARATIVE EXAMPLE 1

A sol of a titanium oxide precursor prepared by introducing 113 g of titanium tetraisopropoxide (hereinafter referred to simply as "TIP") into 1,000 g of a 80% acetic acid solution (this precursor being hereinafter referred to simply as "p-$TiO_2$") and 4,000 g of a sol prepared by dispersing 1.0% by weight of saponite (Sumecton SA, manufactured by Kunimine Industries Co., Ltd.; hereinafter referred to simply as "SAP") in ion-exchanged water are mixed together, and the mixture was stirred at 50 for one hr, thereby preparing a sol comprising p-$TiO_2$ coordinated onto SAP.

p-$TiO_2$ remaining uncoordinated, acetic acid, TIP, and isopropyl alcohol and the like produced by hydrolysis was removed by washing, followed by solid-liquid separation by centrifugation to prepare a cake.

EXAMPLE 1

The cake, before drying, prepared by solid-liquid separation in Comparative Example 1 was dispersed in and mixed with 8,000 g of a 1.0% SAP sol, and the mixture was stirred for 2 hr, followed by solid-liquid separation. The resultant cake was held at 80 until the loss on drying at 110 reached 6%, thereby preparing a dried product.

COMPARATIVE EXAMPLE 2

The dried product prepared in Example 1 was ground in a mortar to prepare a powder having a size of 200 mesh or less which was then heated at 500 for 2 hr until the loss on drying at 110 reached 0.2%.

COMPARATIVE EXAMPLE 3

30 g of kaolin was added to 2 L of a 15 g/L (in terms of $TiO_2$) aqueous titanyl sulfate solution, and the mixture was stirred at 95 for 2 hr, thereby bearing p-$TiO_2$ on the surface of kaolin. After the system was allowed to stand for cooling, solid-liquid separation and washing were repeated to prepare a cake.

EXAMPLE 2

The cake prepared by solid-liquid separation in Comparative Example 3 was introduced into 6,000 g of a 1.0% SAP sol, and the mixture was stirred for 2 hr, followed by solid-liquid separation to prepare a cake. The cake was then held at 80 until the loss on drying at 110 reached 8%, thereby preparing drying the cake.

COMPARATIVE EXAMPLE 4

The cake prepared in Example 2 was held at 60 for 24 hr to prepare a semi-dried product. The semi-dried product thus prepared had a loss on drying at 110 of 28%.

COMPARATIVE EXAMPLE 5

The dried product prepared in Example 2 was ground in a mortar to prepare a powder having a size of 200 mesh or less which was then heated at 500 for 2 hr, thereby preparing a powder having a loss on drying at 110 of not more than 0.2%.

COMPARATIVE EXAMPLE 6

A titanyl sulfate solution having a titanium oxide content of 2% was adjusted to pH 8.5 by the addition of 15% aqueous ammonia and washed and filtered to prepare a hydrated titanium oxide cake. 500 g on a solid basis of the cake was introduced into 8,000 g of a 20% aqueous hydrogen peroxide solution, and the mixture was stirred at 85 for 3 hr, thereby preparing an aqueous titanic acid solution. 56 g of montmorillonite (Kunipia F, manufactured by Kunimine Industries Co., Ltd.; hereinafter referred to simply as "MON") was introduced into this solution, and the mixture was stirred at 95 for 96 hr, thereby bearing titanium oxide on the surface of MON. The system was allowed to stand for cooling, followed by solid-liquid separation to prepare a cake.

EXAMPLE 3

The cake, before drying, prepared by solid-liquid separation in Comparative Example 6 was introduced in 11,200 g of a 1.0% MON sol, and the mixture was stirred for 2 hr, followed by solid-liquid separation to prepare a cake. The cake was then held at 80 until the loss on drying at 110 reached 9%. Thus, a dried cake was prepared.

COMPARATIVE EXAMPLE 7

The dried product prepared in Example 3 was ground in a mortar to prepare a powder having a size of 200 mesh or less, and the powder was then heated at 500 for 2 hr, thereby preparing a powder having a loss on drying at 110 of not more than 0.2%.

[Performance Test]

The powders prepared in Examples 1 to 3 and Comparative Examples 1 to 6 were tested for various properties.

(1) Measurement of UV Reflection Spectrum

The dried products prepared in Examples 1, 2, and 3 and the cakes, prepared in Comparative Examples 1, 3, and 6, after drying at 110 for 16 hr were ground in a mortar to prepare powders having a size of 200 mesh or less. For these powders, the reflectance at each wavelength was measured. The results are given in Table 1. FIG. 1 shows a UV reflection spectrum of the powder prepared in Example 1 (Fig. 1(a)) and a UV reflection spectrum of the powder prepared in Comparative Example 1 (FIG. 1 (b)). These spectra were measured with a UV spectrophotometer V-550 manufactured by Japan Spectroscopic Co., Ltd.

TABLE 1

|  | Wavelength (nm) | | | | |
| --- | --- | --- | --- | --- | --- |
|  | 280 | 320 | 350 | 375 | 400 |
| Ex. 1 | 10 | 9 | 15 | 56 | 83 |
| Comp. Ex. 1 | 10 | 9 | 15 | 53 | 81 |
| Ex. 2 | 10 | 10 | 15 | 54 | 82 |
| Comp. Ex. 3 | 9 | 9 | 15 | 53 | 83 |
| Ex. 3 | 8 | 9 | 16 | 51 | 79 |
| Comp. Ex. 6 | 8 | 9 | 16 | 52 | 80 |

As is apparent from the UV spectra shown in FIG. 1 and the results given in Table 1, there is no significant difference in UV reflection spectrum between the materials, coated with a clay mineral, prepared in Examples 1 to 3 and the materials not coated with the clay mineral prepared in Comparative Examples 1, 3, and 6.

(2) Measurement of Transmitted UV Intensity

The dried powders of Examples 1, 2 and 3 and the dried powders of Comparative Examples 1, 3 and 6 were added to liquid paraffin so that the weight ratio of the titanium oxide to the liquid paraffin was 1:10, followed by thorough dispersion. The thus obtained dispersed sample was sandwiched between two quartz plates with a gap of 0.06 mm being left therebetween, followed by UV irradiation to measure the intensity of transmitted UV at 300 nm. The results of measurement are given in Table 2.

TABLE 2

| Transmitted UV intensity (mW/cm²) | | | | | |
| --- | --- | --- | --- | --- | --- |
|  | Transmitted intensity | Noncoated material | Transmitted intensity | Coated material | Transmitted intensity |
| Blank | 290 | Comp. Ex. 1 | 50 | Ex. 1 | 47 |
|  |  | Comp. Ex. 3 | 48 | Ex. 2 | 47 |
|  |  | Comp. Ex. 6 | 45 | Ex. 3 | 44 |

As is apparent from the results given in Table 2, the difference in transmitted UV intensity between the coated materials and the noncoated materials is small.

(3) Comparison of Swellability and Dispersibility

Each of the dried powders of Examples 1, 2 and 3 and the dried powders having a size of 200 mesh or less of Comparative Example 1, 3 and 6 was placed in an amount of 2 g in a graduated cylinder. After tapping, water was added to the powders, and the mixtures were allowed to stand for 48 hr to determine an increase in bulk of the solid matter. The results are given in Table 3.

TABLE 3

| Comparison of swellability | | | | | |
| --- | --- | --- | --- | --- | --- |
| Noncoated material | Degree of swelling (ml/2 g) | Coated material | Degree of swelling (ml/2 g) | Heated product | Degree of swelling (ml/2 g) |
| Comp. Ex. 1 | 4.2 | Ex. 1 | 18.3 | Comp. Ex. 2 | 5.4 |
| Comp. Ex. 3 | 2.5 | Ex. 2 | 16.8 | Comp. Ex. 5 | 4.8 |
| Comp. Ex. 6 | 2.8 | Ex. 3 | 15.2 | Comp. Ex. 7 | 4.5 |

As is apparent from the results given in Table 3, the dried powders, not coated with the clay mineral, of Comparative Examples 1, 3 and 6 exhibited no significant change in bulk, whereas the dried powders of Examples 1, 2 and 3 exhibited a significant increase in bulk, indicating that the dried products of Examples 1, 2 and 3 could be swollen. On the other hand, the products, of Comparative Examples 2, 5 and 7, which had been baked at 500 for 2 hr, exhibited no increase in bulk, indicating that the swellability was lost.

Figure 2:
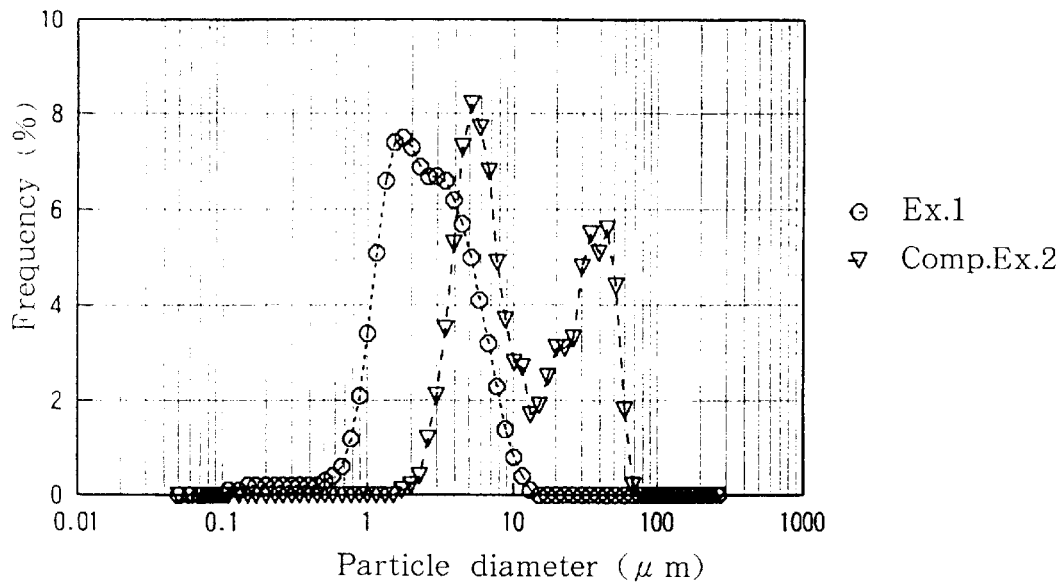
FIG. 2 is a diagram showing particle size distribution before and after swelling/dispersion of powders prepared in Example 1 and Comparative Example 2.

Further, the products, of Example 1 and Comparative Example 2, which had been used in the swelling test were dispersed by means of an ultrasonic oscillator to measure the particle size distribution. The results are shown in FIG. 2. As is apparent from FIG. 2, when the powders were ground to a size of 200 mesh or less, the dried powder of Example 1 and the dried powder of Comparative Example 2 had the same particle size distribution, whereas the swollen product of Example 1 could be easily dispersed in the form of fine particles having a median diameter of 2.2 μm. (4) Comparison of oxidative decomposition capability as photocatalyst The dried powders of Examples 1, 2 and 3 and the semi-dried powder of Comparative Example 4 were swollen with and dispersed in ion-exchanged water to prepare slurries. Separately, the cakes prepared in Comparative Examples 1, 3 and 6 were redispersed to prepare slurries. Each of slurries was applied in an amount of 50 mg in terms of titanium oxide onto a quartz plate having a size of 100 mm square. The coatings were baked at 500 for 2 hr, thereby immobilizing the coatings onto the quartz substrate. The coated quartz substrate together with 100 ppm of acetaldehyde was sealed in a beaker, followed by UV irradiation.

The coatings of Examples 1, 2 and 3 were smooth and transparent.

Results on the concentration of the residual acetaldehyde for Examples 1, 2 and 3 and Comparative Examples 1, 3, 4 and 6 are given in Table 4.

TABLE 4

|  | Concentration of residual acetaldehyde (ppm) UV irradiation time (hr) | | | |
| --- | --- | --- | --- | --- |
|  | 2 | 3 | 6 | 12 |
| Blank | 94 | 91 | 83 | 68 |
| Ex. 1 | 94 | 90 | 81 | 64 |
| Comp. Ex. 1 | 62 | 51 | 36 | 18 |
| Ex. 2 | 91 | 88 | 79 | 62 |
| Comp. Ex. 3 | 44 | 34 | 22 | 6 |
| Comp. Ex. 4 | 77 | 66 | 44 | 19 |
| Ex. 3 | 87 | 84 | 77 | 62 |
| Comp. Ex. 6 | 38 | 22 | 16 | 4 |

Figure 3:
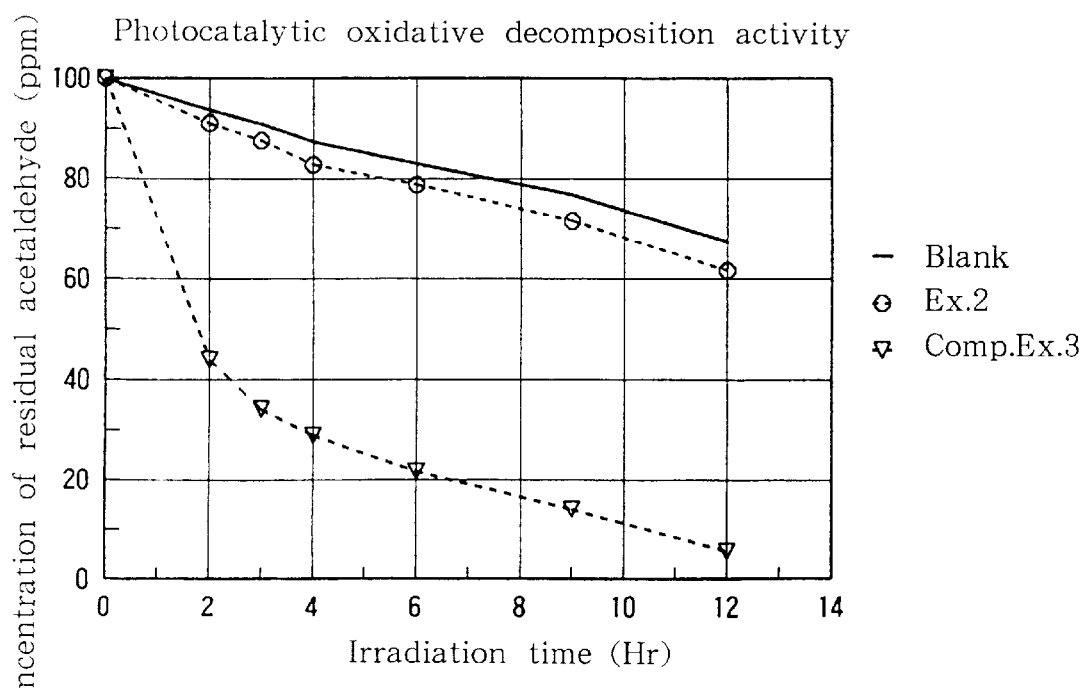
FIG. 3 is a diagram showing the photocatalytic oxidative decomposition activity of powders prepared in Example 2 and Comparative Examples 3 and 4.

A change in amount of residual acetaldehyde for Example 2 and Comparative Examples 3 and 4 is shown in FIG. 3. As is apparent from FIG. 3, for Comparative Example 3, the amount of residual acetaldehyde rapidly decreases with irradiation time, whereas for Example 2, the amount of residual acetaldehyde is substantially equal to the blank value. This indicates that coating with a clay mineral can effectively inhibit the photocatalytic oxidative decomposition.

For comparison with the dried product of Example 2, the semi-dried powder of Comparative Example 4 was measured for the oxidative decomposition activity in the same manner as described above. As a result, the semi-dried powder of Comparative Example 4 exhibited much higher oxidative decomposition activity than the dried product of Example 2. This suggests that when the powder does not have satisfactory heat history, bonding between the material capable of cutting off ultraviolet light and the clay mineral sheet is unsatisfactory, causing a part of the material to be exposed on the surface upon redispersion. This further suggests that grinding also creates a fractured surface, disadvantageously permitting the exposed titanium oxide to exhibit oxidative decomposition capability.

As is apparent from the above comparison, there was no difference in reflection and transmission between the material coated with a clay mineral and the material not coated with a clay mineral, and the coating with a clay mineral is not detrimental to the function of the UV-cutoff material. On the other hand, coating with a clay mineral resulted in markedly reduced photocatalytic oxidative activity, indicating that coating was satisfactory.

Further, sandwiching by the clay mineral facilitated the dispersion of the UV-cutoff material, enabling a transparent, even coating to be formed.

[Effect of the Invention]

Coating of the surface of a metal oxide with an inert material has hitherto been carried out by various methods. These methods are deposition of the inert material onto the surface of particles by hydrolysis or neutralization reaction in a liquid phase, or vapor deposition by CVD or the like. In these methods, however, a mild reaction should be carried out in a very low concentration. This requires special equipment. Further, a part of the metal oxides is coated in an agglomerated state, or otherwise coated particles are fine and still have an agglomerating property. Therefore, the difficulty of providing homogeneous dispersion or coating is left as it is.

According to this invention, coating can be carried by a very simple method which comprises adding a clay mineral sol satisfactorily dispersed in a sheet form in a sol of a material, capable of cutting off ultraviolet light, dispersed in a liquid phase, mixing them together, subjecting the mixture to solid-liquid separation, and conducting heating at a low temperature.

In the coated material thus prepared, the material capable of cutting off ultraviolet light is sandwiched by the clay mineral sheet. Coating of the coated material in the form of a sol prepared by swelling and dispersing the coated material can provide a thin film by virtue of properties inherent in the clay mineral, realizing the formation of a UV-cutoff film having high hiding efficiency. Incorporation of the coated material into a starting resin for a film followed by stretching to align the clay mineral sheet permits fine particles of the UV-cutoff material to be homogeneously dispersed, realizing a film having high percentage hiding. In this case, the thickness of the clay mineral sheet to be applied is small and on the order of nm. Therefore, the UV absorption is not inhibited, and a UV-cutoff activity corresponding to the content of the material capable of cutting off ultraviolet light can be developed. In addition, since the material capable of cutting off ultraviolet light does not come into contact with the organic substrate, the photocatalytic oxidative activity is not developed.

What is claimed is:

1. An ultraviolet-cutoff powder material comprising a powder material, capable of cutting off ultraviolet light, coated with a clay mineral.

2. An ultraviolet-cutoff powder material according to claim 1, wherein the clay mineral is a phyllosilicate.

3. An ultraviolet-cutoff powder material according to claim 2, wherein the phyllosilicate is smectite, vermiculite, or mica.

4. An ultraviolet-cutoff powder material according to claim 1, wherein the powder material capable of cutting off ultraviolet light is at least one member selected from the group consisting of titanium oxide powder, hydrated titanium oxide powder, and a powder of an inorganic material having deposited on the surface thereof at least one member selected from the group consisting of titanium oxide and hydrated titanium oxide.

5. An ultraviolet-cutoff powder material according to claim 2, wherein the powder material capable of cutting off ultraviolet light is at least one member selected from the group consisting of titanium oxide powder, hydrated titanium oxide powder, and a powder of an inorganic material having deposited on the surface thereof at least one member selected from the group consisting of titanium oxide and hydrated titanium oxide.

6. An ultraviolet-cutoff powder material according to claim 3, wherein the powder material capable of cutting off ultraviolet light is at least one member selected from the group consisting of titanium oxide powder, hydrated titanium oxide powder, and a powder of an inorganic material having deposited on the surface thereof at least one member selected from the group consisting of titanium oxide and hydrated titanium oxide.

* * * * *